United States Patent
Tsuchiya (10) Patent No.: US 12,403,786 B2
(45) Date of Patent: Sep. 2, 2025

(54) CHARGING APPARATUS

(71) Applicant: TOYOTA JIDOSHA KABUSHIKI KAISHA, Aichi-ken (JP)

(72) Inventor: Yoshiyuki Tsuchiya, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 748 days.

(21) Appl. No.: 17/694,672

(22) Filed: Mar. 15, 2022

(65) Prior Publication Data

US 2022/0297561 A1  Sep. 22, 2022

(30) Foreign Application Priority Data

Mar. 22, 2021  (JP) ................................. 2021-047078

(51) Int. Cl.
*H02J 7/00* (2006.01)
*B60L 53/35* (2019.01)
*H02J 7/14* (2006.01)
*B60L 53/16* (2019.01)

(52) U.S. Cl.
CPC ............ *B60L 53/35* (2019.02); *H02J 7/0013* (2013.01); *H02J 7/0042* (2013.01); *B60L 53/16* (2019.02)

(58) Field of Classification Search
CPC .......... B60L 53/35; B60L 53/38; B60L 53/39; B60L 53/34; B60L 53/31; B60L 53/30; H02J 7/0013; H02J 7/0042
USPC ................................................. 320/132, 134
See application file for complete search history.

(56) References Cited

U.S. PATENT DOCUMENTS

| | | | |
|---|---|---|---|
| 2011/0074351 A1* | 3/2011 | Bianco | B60L 53/31 320/109 |
| 2011/0140658 A1* | 6/2011 | Outwater | B60L 53/35 320/109 |
| 2013/0307477 A1 | 11/2013 | Reinschke | |
| 2015/0306974 A1* | 10/2015 | Mardall | H01M 10/625 429/120 |
| 2016/0352113 A1* | 12/2016 | Zhao | B60L 53/14 |
| 2017/0158072 A1* | 6/2017 | Sychov | B60L 53/36 |
| 2018/0361870 A1* | 12/2018 | Zhao | B60L 53/68 |
| 2019/0061542 A1* | 2/2019 | Zhao | H02J 7/0013 |

(Continued)

FOREIGN PATENT DOCUMENTS

| | | |
|---|---|---|
| CN | 103429455 A | 12/2013 |
| CN | 105004031 A | 10/2015 |

(Continued)

*Primary Examiner* — Alexis B Pacheco
(74) *Attorney, Agent, or Firm* — HAUPTMAN HAM, LLP (57) ABSTRACT

A charging apparatus is installed in a partition portion that separates a first parking space and a second parking space, and configured to charge an energy storage device mounted on a vehicle parked in one of the first parking space and the second parking space. The charging apparatus includes a movable portion that includes a connection device that is connectable to the energy storage device, and a moving device. The moving device is configured to move the movable portion to one of a first position at which the movable portion projects into a space that is close to the first parking space with respect to the partition portion, a second position at which the movable portion projects into a space that is close to the second parking space with respect to the partition portion, and a third position at which the movable portion is housed in the partition portion.

7 Claims, 7 Drawing Sheets

(56) References Cited

U.S. PATENT DOCUMENTS

| | | | |
|---|---|---|---|
| 2020/0324661 A1* | 10/2020 | Freeling-Wilkinson | ................. B60L 53/305 |
| 2021/0001740 A1* | 1/2021 | Machida | ................. B60L 53/37 |
| 2021/0053456 A1* | 2/2021 | Freeling-Wilkinson | ................. B60L 53/18 |
| 2022/0055491 A1* | 2/2022 | Labell | ................. B60L 53/30 |
| 2023/0023690 A1* | 1/2023 | Hudson | ................. B60L 53/12 |
| 2023/0374809 A1* | 11/2023 | Jung | ................. B66B 1/2416 |

FOREIGN PATENT DOCUMENTS

| | | |
|---|---|---|
| CN | 110588408 A | 12/2019 |
| CN | 211473568 U | 9/2020 |
| CN | 212027308 U | 11/2020 |
| JP | 2011-109807 A | 6/2011 |

* cited by examiner

CHARGING APPARATUS

CROSS-REFERENCE TO RELATED APPLICATION

This application claims priority to Japanese Patent Application No. 2021-047078 filed on Mar. 22, 2021, incorporated herein by reference in its entirety.

BACKGROUND

1. Technical Field

The present disclosure relates to a charging apparatus configured to charge an energy storage device mounted on a vehicle.

2. Description of Related Art

A charging apparatus for charging an energy storage device mounted on a vehicle etc. is installed outside the vehicle etc., such as in a parking lot or on a sidewalk. However, such a charging apparatus may disturb traveling of vehicles or walking as it occupies an installation space. A technique of rendering the charging apparatus movable and housing the charging apparatus under the ground, for example, is known in the art.

Japanese Unexamined Patent Application Publication No. 2011-109807 (JP 2011-109807 A), for example, discloses a charging pole installed so as to be movable up and down, to be elevated to stand on the ground and lowered to be housed under the ground.

SUMMARY

A parking lot in which vehicles are parked occasionally includes parking spaces provided in a plurality of levels, such as when the parking lot is a multilevel parking lot or when parking spaces are provided both on and under the ground. Therefore, in order to enable electric vehicles to be charged in each level, it is conceivable to install the movable charging apparatus discussed above in each level, for example. However, it may be expensive to install the movable charging apparatus in each level. Further, it may also be expensive to install the movable charging apparatus in each of parking spaces in a case a large number of parking spaces are provided in a single-level parking lot.

The present disclosure provides a charging apparatus that suppresses an increase in the installation cost for installing the charging apparatus so as to be usable in a plurality of parking spaces.

A charging apparatus according to an aspect of the present disclosure is installed in a partition portion that separates a first parking space and a second parking space, and configured to charge an energy storage device mounted on a vehicle parked in one of the first parking space and the second parking space. The charging apparatus includes a movable portion that includes a connection device that is connectable to the energy storage device, and a moving device. The moving device is configured to move the movable portion to one of a first position at which the movable portion projects into a space that is close to the first parking space with respect to the partition portion, a second position at which the movable portion projects into a space that is close to the second parking space with respect to the partition portion, and a third position at which the movable portion is housed in the partition portion.

With such a configuration, the energy storage device mounted on the vehicle parked in either the first parking space or the second parking space can be charged using a single charging apparatus. Consequently, it is not necessary to install the charging apparatus in each of the first parking space and the second parking space. Therefore, it is possible to suppress an increase in the installation cost for installing the charging apparatus so as to be usable in a plurality of parking spaces.

In the charging apparatus according to the aspect of the present disclosure, the first parking space may be located in a level directly above a level of the second parking space. The partition portion may be provided between a floor of the first parking space and a ceiling of the second parking space.

With such a configuration, the energy storage device mounted on the vehicle parked in either the first parking space or the second parking space, which are located separately in the upper and lower levels, can be charged using a single charging apparatus. Consequently, it is not necessary to install the charging apparatus in each of the first parking space and the second parking space. Therefore, it is possible to suppress an increase in the installation cost for installing the charging apparatus so as to be usable in a plurality of parking spaces.

In the charging apparatus according to the aspect of the present disclosure, the first parking space may be adjacent to the second parking space in a horizontal direction. The partition portion may be provided between a partition wall of the first parking space and a partition wall of the second parking space.

With such a configuration, the energy storage device mounted on the vehicle parked in either the first parking space or the second parking space, which are adjacent in the horizontal direction, can be charged using a single charging apparatus. Consequently, it is not necessary to install the charging apparatus in each of the first parking space and the second parking space. Therefore, it is possible to suppress an increase in the installation cost for installing the charging apparatus so as to be usable in a plurality of parking spaces.

In the charging apparatus according to the aspect of the present disclosure, the charging apparatus may further include a control device configured to control the moving device using information acquired from an external device that is external to the charging apparatus. The control device may be configured to control the moving device so as to move the movable portion to one of the first position, the second position, and the third position corresponding to a movement request to move the movable portion when the movement request is acquired from the external device.

With such a configuration, the movable portion can be moved to one of the first position, the second position, and the third position in accordance with the movement request from the external device.

With the present disclosure, it is possible to provide a charging apparatus that suppresses an increase in the installation cost for installing the charging apparatus so as to be usable in a plurality of parking spaces.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of the present disclosure will be described in detail below with reference to the drawings. The same or corresponding parts are denoted by the same signs throughout the drawings, and description thereof will not be repeated.

Figure 1:
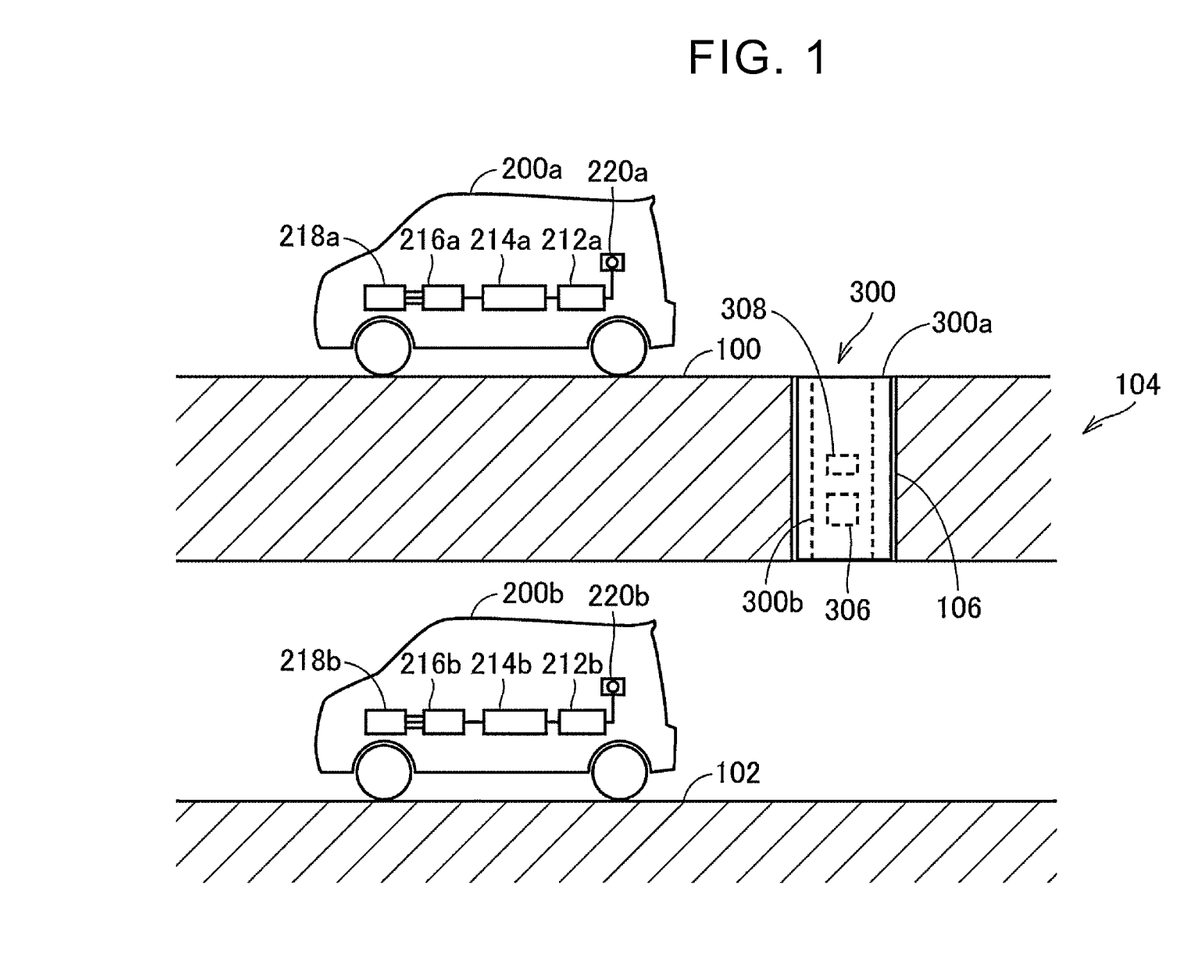
FIG. 1 illustrates an example of the configuration of a charging station in a state in which a movable portion is housed in a partition portion between a first parking space and a second parking space and electric vehicles.

The configuration of a charging station 300 that is a charging apparatus according to an embodiment of the present disclosure will be described below by way of example. FIG. 1 illustrates an example of the configuration of the charging station 300 in a state in which a movable portion 300a is housed in a partition portion 104 between a first parking space and a second parking space and electric vehicles 200a, 200b.

In the state illustrated in FIG. 1, the charging station 300 is configured such that the upper end of the charging station 300 is generally positioned at the same position as the floor surface of a first parking space 100 and the lower end of the charging station 300 is generally positioned at the same position as the ceiling surface of a second parking space 102.

The charging station 300 has a housing in a cylindrical shape, and is installed in an opening portion 106 formed in a portion of the partition portion 104 between the floor surface of the first parking space 100 and the ceiling surface of the second parking space 102.

The opening portion 106 is formed to penetrate the partition portion 104 in the vertical direction. The opening portion 106 has a circular cross-sectional shape, and is formed to have a predetermined gap between an inner peripheral surface of the opening portion 106 and an outer peripheral surface of the housing of the charging station 300. Further, the opening portion 106 is formed so as to have a length that is about the same as the length of the charging station 300 in the vertical direction in the state illustrated in FIG. 1.

The first parking space 100 and the second parking space 102 are located separately in upper and lower levels. More specifically, the first parking space 100 is located in the level directly above the level of the second parking space 102.

The charging station 300 includes a movable portion 300a and a fixed portion 300b. A storage space (not illustrated) in which a connector 302 (see FIGS. 2 and 3) can be housed is formed in the movable portion 300a. One end of a cable 304 (see FIGS. 2 and 3) is connected to the connector 302, while the other end of the cable 304 is connected to a power source (not illustrated). The power source may be an alternating-current (AC) power source such as a commercial power source, for example. The cable 304 has a shape-based expandable portion that has a curled portion or a structure-based expandable portion that has a winding structure, and is configured to be expandable to an inlet of an electric vehicle parked in either the first parking space 100 or the second parking space 102 when the connector 302 is taken out.

Figure 2:
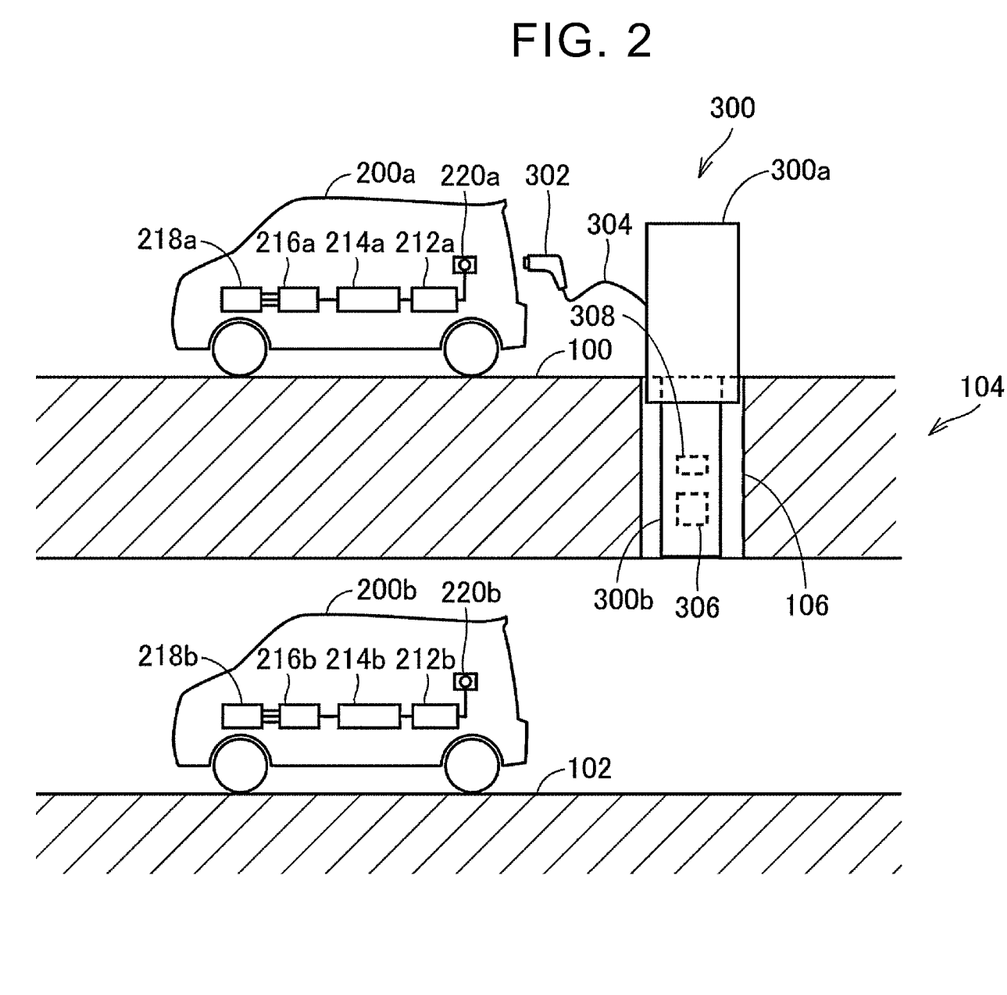
FIG. 2 illustrates an example of the configuration of the charging station with the movable portion located at a first position and the electric vehicles.

The movable portion 300a of the charging station 300 is configured to be movable to a first position at which the movable portion 300a projects into a space on the first parking space 100 side.

FIG. 2 illustrates an example of the configuration of the charging station 300 with the movable portion 300a located at the first position and the electric vehicles 200a, 200b. When the movable portion 300a of the charging station 300 is elevated to the first position on the first parking space 100 side, as illustrated in FIG. 2, the connector 302 housed in the movable portion 300a can be taken out of the movable portion 300a to be connected to an inlet 220a of the electric vehicle 200a parked in the first parking space 100.

Figure 3:
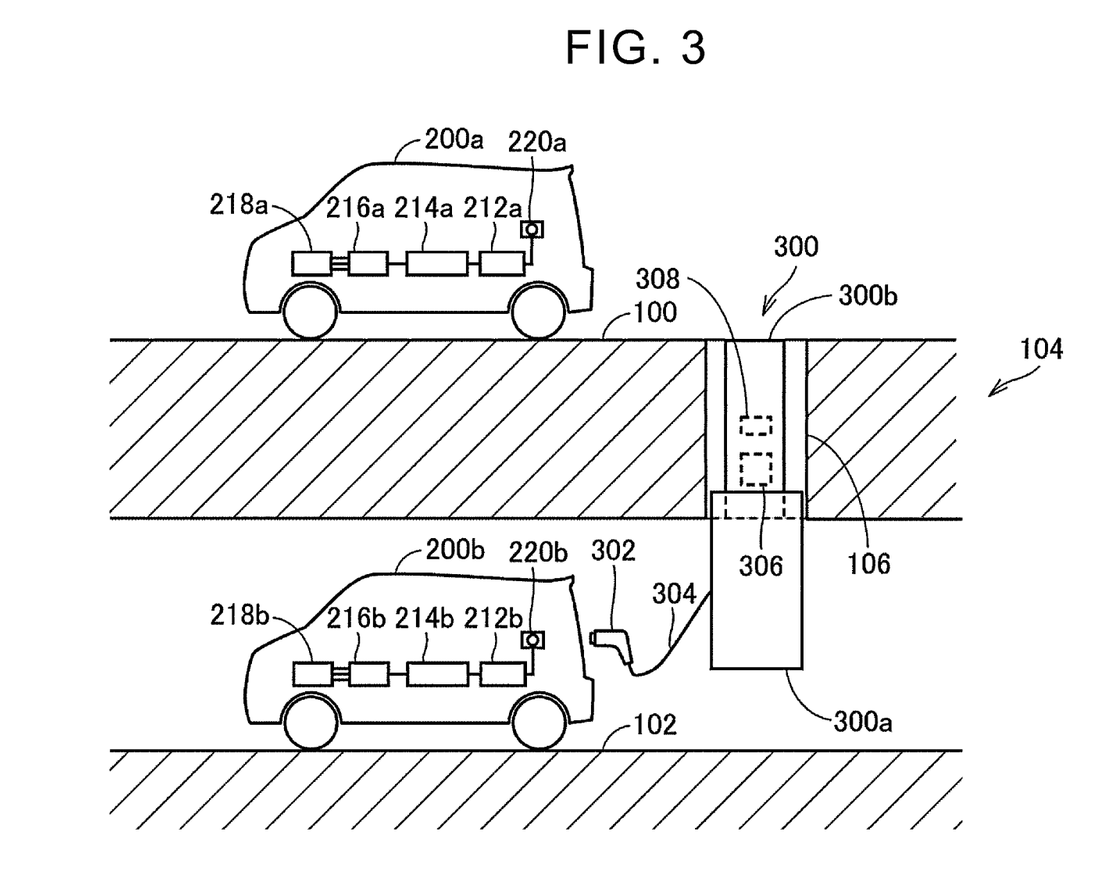
FIG. 3 illustrates an example of the configuration of the charging station with the movable portion located at a second position and the electric vehicles.

Further, the movable portion 300a is configured to be movable to a second position at which the movable portion 300a projects into a space on the second parking space 102 side.

FIG. 3 illustrates an example of the configuration of the charging station 300 with the movable portion 300a located at the second position and the electric vehicles 200a, 200b. When the movable portion 300a of the charging station 300 is lowered to the second position on the second parking space 102 side, as illustrated in FIG. 3, the connector 302 housed in the movable portion 300a can be taken out of the movable portion 300a to be connected to an inlet 220b of the electric vehicle 200b parked in the second parking space 102.

The connector 302 is housed at a position at which the connector 302 can be taken out of the movable portion 300a to the inlet 220a of the electric vehicle 200a by a user situated in the level of the first parking space 100 when the movable portion 300a is located at the first position, for example. Further, the connector 302 is housed at a position at which the connector 302 can be taken out of the movable portion 300a to the inlet 220b of the electric vehicle 200b by a user situated in the level of the second parking space 102 when the movable portion 300a is located at the second position, for example.

While the connector 302 is described as being housed at a middle portion, in the up-down direction, of the movable portion 300a in the present embodiment, for example, the connector 302 is not specifically limited to being housed at a middle portion in the up-down direction.

For example, a first connector that can be taken out of the movable portion 300a by a user situated in the level of the first parking space 100 when the movable portion 300a is located at the first position may be housed at the upper end of the movable portion 300a. Further, a second connector that can be taken out of the movable portion 300a by a user situated in the level of the second parking space 102 when the movable portion 300a is located at the second position may be housed at the lower end of the movable portion 300a.

Further, the movable portion 300a is configured to be held at a third position at which the movable portion 300a is housed in the partition portion 104 as illustrated in FIG. 1.

The fixed portion 300b is fixed to the inner wall portion of the opening portion 106. The fixed portion 300b includes an elevating device 306 that elevates and lowers the movable portion 300a in the up-down direction and a control device 308 that controls operation of the elevating device 306.

The elevating device 306 may have a rack-and-pinion mechanism that elevates and lowers the movable portion 300a by rotating a pinion gear meshed with a rack gear fixed to the movable portion 300a using an electric actuator, may have a mechanism that uses a hydraulic cylinder and that elevates and lowers the movable portion 300a by increasing and decreasing a hydraulic pressure to be supplied to a cylinder body fixed to the fixed portion 300b with a rod connected a piston fixed to the movable portion 300a, or may have a mechanism that elevates and lowers the movable portion 300a by generating a magnetic repulsive force between the movable portion 300a and the fixed portion 300b, for example.

The elevating device 306 is configured such that the movable portion 300a is not elevated beyond the first position or not lowered beyond the second position using a stopper mechanism etc., for example. The elevating device 306 may have a lock mechanism configured to limit the position of the movable portion 300a at the third position and cancel the limitation on the position of the movable portion 300a, for example. The elevating device 306 is an example of a moving device according to the present disclosure.

The control device 308 includes a central processing unit (CPU) and a memory composed of a read only memory (ROM), a random access memory (RAM), etc. The control device 308 controls an electric device (e.g. the elevating device 306) provided in the charging station 300 based on information stored in the memory, information acquired from the outside of the charging station 300 using a communication device (not illustrated), and information acquired from various sensors. This control is not limited to software processing executed by the CPU, and may be constructed by dedicated hardware (an electronic circuit).

The charging station 300 is configured to be able to communicate various kinds of information with devices that are external to the charging station 300 using the communication device. The charging station 300 may be configured to be communicable with a management server (not illustrated) that manages a plurality of charging stations including the charging station 300, may be configured to be communicable with a portable terminal (not illustrated) owned by a user, may be configured to be communicable with electric vehicles (the electric vehicles 200a, 200b in FIG. 1) to be charged by the charging station 300, or may be configured to be communicable with another charging station 300, for example.

The control device 308 controls the elevating device 306 such that the movable portion 300a is elevated from the third position to the first position when a condition for executing elevation control is met, for example. The condition for executing the elevation control includes a condition that the movable portion 300a is located at the third position and a condition that there is a request to execute the elevation control (hereinafter referred to as an "elevation request"), for example. The elevation request may be received from the electric vehicle 200a parked in the first parking space 100, or may be received from the management server, the portable terminal, or another charging station 300, for example. The condition for executing the elevation control may include a condition that the movable portion 300a is located at the second position or the third position, in place of the condition that the movable portion 300a is located at the third position. The control device 308 detects the amount of elevation of the movable portion 300a using a sensor (not illustrated), and elevates the movable portion 300a until the amount of elevation of the movable portion 300a reaches a value that is equivalent to the first position, for example.

The control device 308 sets a first flag, which indicates that the movable portion 300a is located at the first position, to an on state when the movable portion 300a is located at the first position, for example. The control device 308 sets the first flag to an off state when the movable portion 300a is located at a position other than the first position, for example.

Alternatively, the control device 308 controls the elevating device 306 such that the movable portion 300a is lowered from the third position to the second position when a condition for executing lowering control is met, for example. The condition for executing the lowering control includes a condition that the movable portion 300a is located at the third position and a condition that there is a request to execute the lowering control (hereinafter referred to as a "lowering request"), for example. The lowering request may be received from the electric vehicle 200b parked in the second parking space 102, or may be received from the management server, the portable terminal, or another charging station 300, for example. The condition for executing the lowering control may include a condition that the movable portion 300a is located at the first position or the third position, in place of the condition that the movable portion 300a is located at the third position. The control device 308 lowers the movable portion 300a until the amount of elevation of the movable portion 300a reaches a value that is equivalent to the second position, for example.

The control device 308 sets a second flag, which indicates that the movable portion 300a is located at the second position, to an on state when the movable portion 300a is located at the second position, for example. The control device 308 sets the second flag to an off state when the movable portion 300a is located at a position other than the second position, for example.

Further, the control device 308 controls the elevating device 306 such that the movable portion 300a is moved from the first position or the second position to the third position when a condition for executing storage control is met. Specifically, the control device 308 executes the lowering control such that the movable portion 300a is lowered from the first position to the third position to be housed in the partition portion 104 when the movable portion 300a is located at the first position and the condition for executing the storage control is met, for example. Further, the control device 308 executes the elevation control such that the movable portion 300a is elevated from the second position to the third position to be housed in the partition portion 104 when the movable portion 300a is located at the second position and the condition for executing the storage control is met, for example. In addition, the control device 308 elevates and lowers the movable portion 300a until the amount of elevation of the movable portion 300a reaches a value that is equivalent to the third position, for example.

The control device 308 sets a third flag, which indicates that the movable portion 300a is located at the third position, to an on state when the movable portion 300a is located at the third position, for example. The control device 308 sets the third flag to an off state when the movable portion 300a is located at a position other than the third position, for example.

The condition for executing the storage control includes a condition that the movable portion 300a is located at the first position or the second position and a condition that there is a storage request to house the charging station 300. The storage request may be received from the electric vehicle 200a parked in the first parking space 100 or the electric vehicle 200b parked in the second parking space 102 when the movable portion 300a is located at the first position, for example. Alternatively, the storage request may be received from the electric vehicle 200a parked in the first parking space 100 or the electric vehicle 200b parked in the second parking space 102 when the movable portion 300a is located at the second position, for example. Alternatively, the storage request may be received from the management server, the portable terminal, or another charging station 300, for example.

FIGS. 1, 2, and 3 further illustrate an example of the configuration of the electric vehicle 200a parked in the first parking space 100 and the configuration of the electric vehicle 200b parked in the second parking space 102, the electric vehicles 200a, 200b being chargeable by the charging station 300.

As illustrated in FIGS. 1, 2, and 3, the electric vehicles 200a, 200b include vehicles on which an energy storage device is mounted, such as plug-in hybrid vehicles and electric vehicles, for example. It is only necessary that the electric vehicles 200a, 200b should have components that enable reception of electric power supplied from the charging station 300. In particular, the electric vehicles 200a, 200b are not limited to the vehicles mentioned above, and may be vehicles on which an energy storage device for external power supply is mounted, for example.

An example of the configuration of the electric vehicle 200a will be described below. The electric vehicle 200a includes a charger 212a, a battery 214a, an inverter 216a, a motor generator 218a, and an inlet 220a.

When AC electric power is supplied from the inlet 220a, the charger 212a converts the supplied AC electric power into direct-current (DC) electric power, and supplies the DC electric power to the battery 214a. The battery 214a is charged through operation of the charger 212a. The charger 212a is controlled in accordance with a control signal from an electronic control unit (ECU) (not illustrated) of the electric vehicle 200a, for example.

The battery 214a is a rechargeable electric power storage element, for example. A secondary battery such as a nickel metal hydride battery or a lithium ion battery containing a liquid or solid electrolyte is typically used as the battery 214a. Alternatively, the battery 214a may be an energy storage device that can store electric power. A large-capacity capacitance may be used in place of the battery 214a, for example.

The inverter 216a converts DC electric power from the battery 214a into AC electric power, and supplies the AC electric power to the motor generator 218a, for example. The inverter 216a also converts AC electric power (regenerated electric power) from the motor generator 218a into DC electric power, and supplies the DC electric power to the battery 214a to charge the battery 214a, for example.

The motor generator 218a receives electric power supplied from the inverter 216, and supplies a rotational force to drive wheels. The drive wheels are rotated by the rotational force supplied by the motor generator 218a, and cause the electric vehicle 200a to travel.

The inlet 220a is provided in an exterior portion of the electric vehicle 200a together with a cover (not illustrated) such as a lid. The inlet 220a is a power reception portion that receives charging electric power supplied from an external charging apparatus (e.g. the charging station 300). The inlet 220a is shaped to enable the connector 302 of the charging station 300 to be attached thereto. Both the inlet 220a and the connector 302 have built-in contacts. When the connector 302 is attached to the inlet 220a, the contacts contact each other to electrically connect the inlet 220a and the connector 302 to each other. At this time, the battery 214a of the electric vehicle 200a can be charged using electric power supplied from the charging station 300.

The charger 212b, the battery 214b, the inverter 216b, the motor generator 218b, and the inlet 220b included in the electric vehicle 200b have the same configuration as the charger 212a, the battery 214a, the inverter 216a, the motor generator 218a, and the inlet 220a, respectively, included in the electric vehicle 200a. Therefore, detailed description thereof will not be repeated.

A charging apparatus for charging the batteries 214a, 214b mounted on the electric vehicles 200a, 200b discussed above is installed in a parking lot or on a sidewalk, for example. However, such a charging apparatus may disturb traveling of vehicles or walking as it occupies an installation space. Therefore, the charging apparatus is occasionally rendered movable, and housed under the ground, for example.

Meanwhile, a parking lot in which vehicles are parked occasionally includes parking spaces provided in a plurality of levels, such as when the parking lot is a multilevel parking lot or when parking spaces are provided both on and under the ground. Therefore, in order to enable electric vehicles to be charged in each level, it is conceivable to install the movable charging apparatus in each level, for example. However, it may be expensive to install the movable charging apparatus in each level.

Thus, in the present embodiment, as described with reference to FIGS. 1, 2, and 3, the charging station 300 is a movable charging apparatus that is installed in the partition portion 104 which separates the first parking space 100 and the second parking space 102 and that can charge an energy storage device (the battery 214a or the battery 214b) mounted on an electric vehicle (the electric vehicle 200a or the electric vehicle 200b) parked in one of the first parking space 100 and the second parking space 102. The charging station 300 includes the movable portion 300a that includes the connector 302 which is a connection device that is connectable to the battery 214a or the battery 214b, and the elevating device 306 that moves the movable portion 300a to one of the first position at which the movable portion 300a projects into the space on the first parking space 100 side with respect to the partition portion 104, the second position at which the movable portion 300a projects into the space on the second parking space 102 side with respect to the partition portion 104, and the third position at which the movable portion 300a is housed in the partition portion 104.

With such a configuration, the battery mounted on the vehicle parked in either the first parking space 100 or the second parking space 102 can be charged using a single charging station 300. Consequently, it is not necessary to install the charging station 300 in each of the first parking space 100 and the second parking space 102. Therefore, it is possible to suppress an increase in the installation cost for installing the charging apparatus so as to be usable in a plurality of parking spaces.

Figure 4:
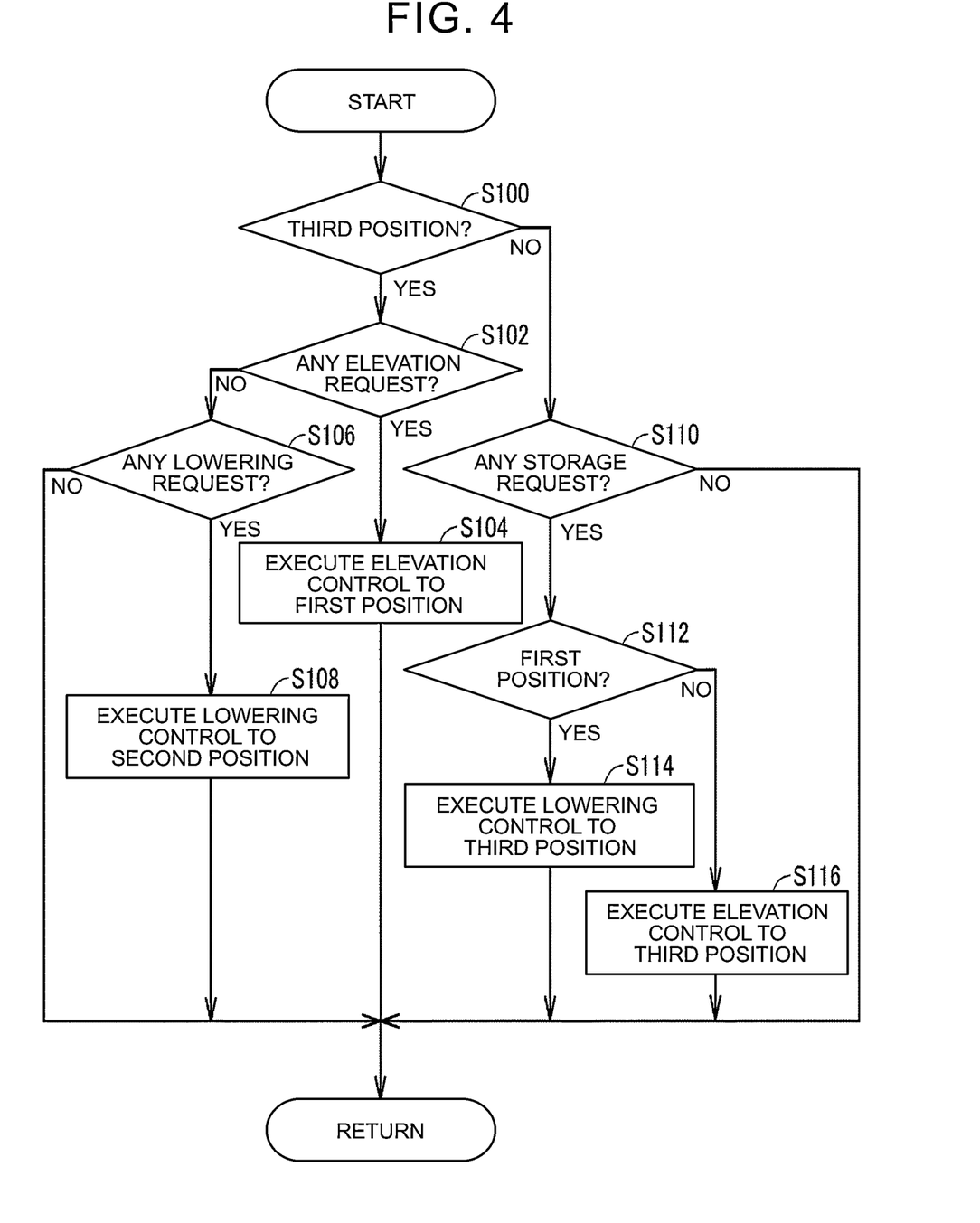
FIG. 4 is a flowchart illustrating an example of processes executed by a control device.

An example of control processes executed by the control device 308 will be described below with reference to FIG. 4. FIG. 4 is a flowchart illustrating an example of processes executed by the control device 308. The sequence of processes indicated in the flowchart is executed by the control device 308 repeatedly in predetermined control cycles.

In step (hereinafter abbreviated as "S") 100, the control device 308 determines whether the movable portion 300a is located at the third position. The control device 308 determines that the movable portion 300a is located at the third position when the third flag discussed above is in the on state, for example. The process proceeds to step S102 when it is determined that the movable portion 300a is located at the third position (YES in step S100).

In step S102, the control device 308 determines whether there is an elevation request. Specifically, the control device 308 may determine that there is an elevation request when information that indicates a request to execute the elevation control is received from the electric vehicle 200a, the management server, a portable terminal carried by the user of the electric vehicle 200a, or an external device such as another charging station 300, for example. The process proceeds to S104 when it is determined that there is an elevation request (YES in S102).

In S104, the control device 308 executes the elevation control until the movable portion 300a reaches the first position. The process proceeds to S106 when it is determined that there is no elevation request (NO in S102).

In step S106, the control device 308 determines whether there is a lowering request. Specifically, the control device 308 may determine that there is a lowering request when information that indicates a request to execute the lowering control is received from the electric vehicle 200a, 200b, the management server, a portable terminal carried by the user of the electric vehicle 200a, a portable terminal carried by the user of the electric vehicle 200b, or an external device such as another charging station 300, for example. The process proceeds to S108 when it is determined that there is a lowering request (YES in S106).

In S108, the control device 308 executes the lowering control until the movable portion 300a reaches the second position. This process is ended when it is determined that there is no lowering request (NO in S106). The process proceeds to S110 when it is determined that the movable portion 300a is not located at the third position (NO in S100).

In S110, the control device 308 determines whether there is a storage request. Specifically, the control device 308 may determine that there is a storage request when information that indicates a request to execute the storage control is received from the electric vehicle 200a, 200b, the management server, a portable terminal carried by the user of the electric vehicle 200a, a portable terminal carried by the user of the electric vehicle 200b, or an external device such as another charging station 300, for example. The process proceeds to S112 when it is determined that there is a storage request (YES in S110).

In S112, the control device 308 determines whether the movable portion 300a is located at the first position. The control device 308 determines that the movable portion 300a is located at the first position when the first flag discussed above is in the on state, for example. The control device 308 determines that the movable portion 300a is not located at the first position when the second flag is in the on state, for example. The process proceeds to step S114 when it is determined that the movable portion 300a is located at the first position (YES in step S112).

In S114, the control device 308 executes the lowering control until the movable portion 300a reaches the third position. The process proceeds to S116 when it is determined that the movable portion 300a is not located at the first position (NO in S112).

In S116, the control device 308 executes the elevation control until the movable portion 300a reaches the third position. This process is ended when it is determined that there is no storage request (NO in S110).

An example of operation of the control device 308 according to the present embodiment based on the structure and the flowchart described above will be described.

A case where the movable portion 300a is located at the third position as illustrated in FIG. 1, for example, is assumed. When the movable portion 300a is located at the third position (YES in S100), it is determined whether there is an elevation request (S102). When there is no elevation request (NO in S102), it is determined whether there is a lowering request (S106).

For example, when a request to elevate the charging station 300 is made by the user of the electric vehicle 200a parked in the first parking space 100 using the electric vehicle 200a or using the portable terminal carried by the user of the electric vehicle 200a (YES in S102), the elevation control is executed until the movable portion 300a reaches the first position (S104).

With the movable portion 300a moved to the first position, the user of the electric vehicle 200a can take the connector 302 out of the movable portion 300a and connect the connector 302 that has been taken out to the inlet 220a of the electric vehicle 200a. This allows the battery 214a mounted on the electric vehicle 200a to be charged.

Alternatively, when a request to lower the charging station 300 is made by the user of the electric vehicle 200b parked in the second parking space 102 using the electric vehicle 200b or using the portable terminal carried by the user of the electric vehicle 200b (YES in S106), for example, the lowering control is executed until the movable portion 300a reaches the second position (S108).

With the movable portion 300a moved to the second position, the user of the electric vehicle 200b can take the connector 302 out of the movable portion 300a and connect the connector 302 that has been taken out to the inlet 220b of the electric vehicle 200b. This allows the battery 214b mounted on the electric vehicle 200b to be charged.

Next, a case where the movable portion 300a is located at the first position as illustrated in FIG. 2, for example, is assumed. It is determined whether there is a storage request (S110), since the movable portion 300a is not located at the third position (NO in S100).

When, because of a completion of charging the battery 214a, a request to house the charging station 300 is made by the user of the electric vehicle 200a using the electric vehicle 200a or the portable terminal carried by the user of the electric vehicle 200a (YES in S110), for example, the lowering control is executed until the movable portion 300a reaches the third position (S114), since the movable portion 300a is located at the first position (YES in S112). When the movable portion 300a is moved to the third position, the movable portion 300a is housed in the partition portion 104.

Next, a case where the movable portion 300a is located at the second position as illustrated in FIG. 3, for example, is assumed. It is determined whether there is a storage request (S110), since the movable portion 300a is not located at the third position (NO in S100).

When, because of a completion of charging the battery 214b, a request to house the charging station 300 is made by the user of the electric vehicle 200b using the electric vehicle 200b or the portable terminal carried by the user of the electric vehicle 200b (YES in S110), for example, the elevation control is executed until the movable portion 300a reaches the third position (S116), since the movable portion 300a is not located at the first position (NO in S112). When the movable portion 300a is moved to the third position, the movable portion 300a is housed in the partition portion 104.

With the charging station 300 as the charging apparatus according to the present embodiment, as described above, it is possible to charge the battery mounted on the vehicle parked in either the first parking space 100 or the second parking space 102, which are located separately in the upper and lower levels, using the single charging station 300. Consequently, it is not necessary to install the charging station 300 in each of the level of the first parking space 100 and the level of the second parking space 102. Thus, it is possible to provide a charging apparatus that suppresses an increase in the installation cost for installing the charging apparatus so as to be usable in a plurality of parking spaces.

Further, the movable portion 300a can be moved to any of the first position, the second position, and the third position in accordance with a request from an external device such as the electric vehicle 200a, 200b, the portable terminal of the user of the electric vehicle 200a, the portable terminal of the user of the electric vehicle 200b, or the management server that manages the charging station 300.

Modifications will be described below. While the power source is described as an AC power source in the embodiment discussed above, the power source may be a DC power source. In this case, the chargers 212a, 212b may be omitted from the electric vehicles 200a, 200b, for example.

While the connector 302 is described as being housed in the storage space in the movable portion 300a in the embodiment discussed above by way of example, a socket may be provided as exposed on a side surface of the middle portion, in the up-down direction, of the movable portion 300a, for example. With such a configuration, the user can charge the battery 214a mounted on the electric vehicle 200a by connecting the socket of the charging station 300 and the inlet 220a of the electric vehicle 200a, or can charge the battery 214b mounted on the electric vehicle 200b by connecting the socket of the charging station 300 and the inlet 220b of the electric vehicle 200b, using a charging cable prepared separately.

While the housing of the charging station 300 is described as having a cylindrical shape in the embodiment discussed above by way of example, the housing may have any shape that specifically enables elevating operation, and is not specifically limited to having a cylindrical shape. For example, the housing of the charging station 300 may have a rectangular parallelepiped shape.

While the first parking space 100 and the second parking space 102 are located separately in the upper and lower levels and the movable portion 300a is rendered movable in the up-down direction to be able to charge the battery of the electric vehicle parked in either of the parking spaces using the single charging station 300 in the embodiment discussed above by way of example, the first parking space and the second parking space may be located adjacent to each other in the horizontal direction, for example.

The installation cost for a charging apparatus may also be high when a movable charging apparatus is installed for each of a large number of parking spaces set in a single-level parking lot. Therefore, the charging station 300 may be provided in a partition portion set between a partition wall of a first parking space and a partition wall of a second parking space.

Figure 5:
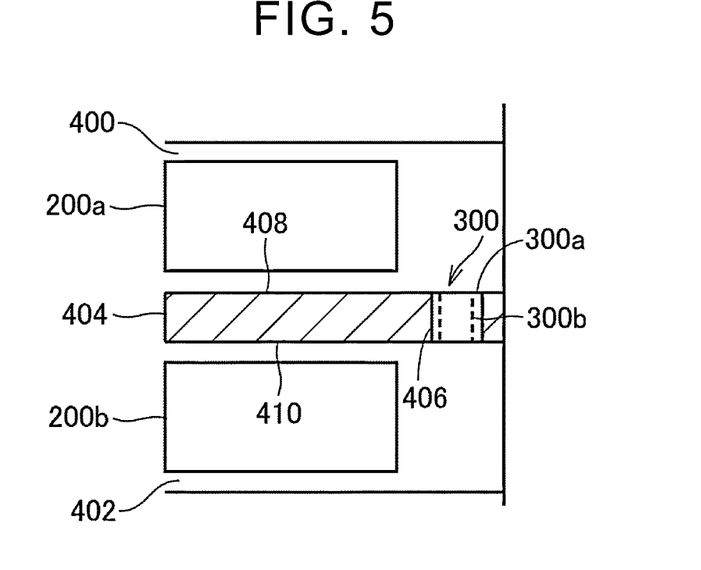
FIG. 5 illustrates an example of the configuration of a charging station in a state in which a movable portion is housed in a partition portion between a first parking space and a second parking space and electric vehicles according to a modification.

FIG. 5 illustrates an example of the configuration of the charging station 300 in a state in which the movable portion 300a is housed in a partition portion 404 between a first parking space 400 and a second parking space 402 and the electric vehicles 200a, 200b according to a modification.

In the modification, as illustrated in FIG. 5, the first parking space 400 and the second parking space 402 are located adjacent to each other in the horizontal direction via the partition portion 404. More specifically, the first parking space 400 and the second parking space 402 are set such that the electric vehicle 200a parked in the first parking space 400 and the electric vehicle 200b parked in the second parking space 402 are arranged side by side with each other.

The charging station 300 has a housing in a cylindrical shape, and is installed in an opening portion 406 formed in a portion of the partition portion 404 between a partition wall 408 of the first parking space 400 and a partition wall 410 of the second parking space 402.

The opening portion 406 is formed to penetrate the partition portion 404 in the horizontal direction. The opening portion 406 has a circular cross-sectional shape, and is formed to have a predetermined gap between an inner peripheral surface of the opening portion 406 and an outer peripheral surface of the housing of the charging station 300. Further, the opening portion 406 is formed so as to have a length that is about the same as the length of the charging station 300 in the horizontal direction (the up-down direction on the sheet surface of FIG. 5) in the state illustrated in FIG. 5.

The charging station 300 includes a movable portion 300a and a fixed portion 300b. A storage space in which a connector 302 (see FIGS. 6 and 7) can be housed is formed in the movable portion 300a. One end of a cable 304 (see FIGS. 6 and 7) is connected to the connector 302, while the other end of the cable 304 is connected to a power source (not illustrated). The configuration of the connector 302, the cable 304, and the power source is similar to the configuration of the connector 302, the cable 304, and the power source described in relation to the embodiment discussed above. Therefore, detailed description thereof will not be repeated.

Figure 6:
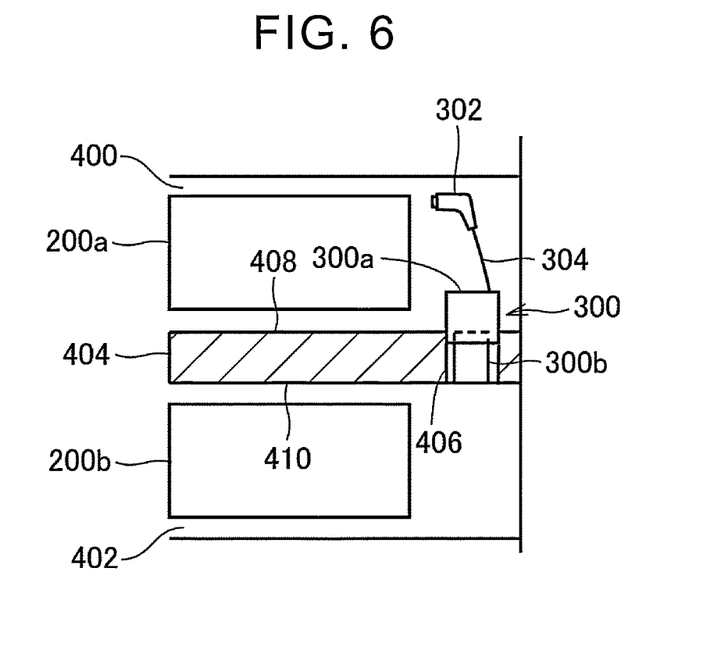
FIG. 6 illustrates an example of the configuration of the charging station with the movable portion located at a first position and the electric vehicles according to the modification.

The movable portion 300a of the charging station 300 is configured to be movable to a first position at which the movable portion 300a projects into a space on the first parking space 400 side.

FIG. 6 illustrates an example of the configuration of the charging station 300 with the movable portion 300a located at the first position and the electric vehicles 200a, 200b according to the modification. When the movable portion 300a of the charging station 300 is moved to the first position on the first parking space 400 side, as illustrated in FIG. 6, the connector 302 housed in the movable portion 300a can be taken out of the movable portion 300a to be connected to an inlet (not illustrated) of the electric vehicle 200a parked in the first parking space 400.

Figure 7:
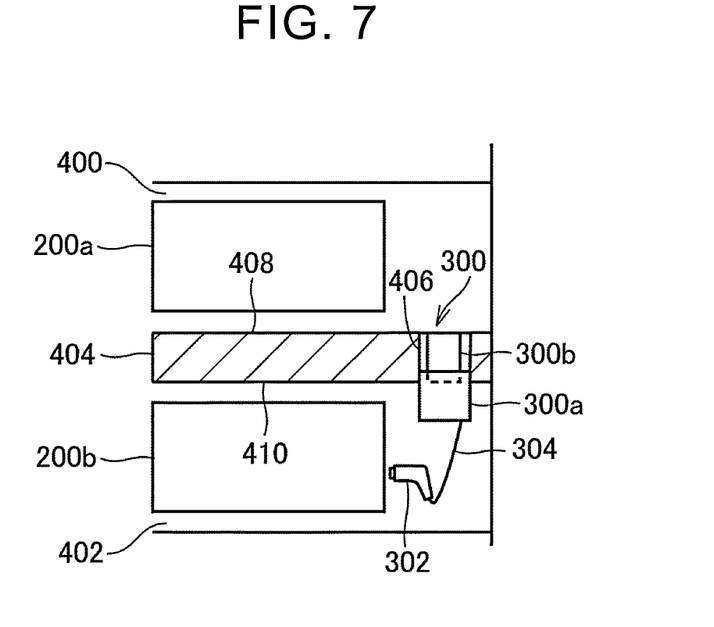
FIG. 7 illustrates an example of the configuration of the charging station with the movable portion located at a second position and the electric vehicles according to the modification.

Further, the movable portion 300a is configured to be movable to a second position at which the movable portion 300a projects into a space on the second parking space 402 side.

FIG. 7 illustrates an example of the configuration of the charging station 300 with the movable portion 300a located at the second position and the electric vehicles 200a, 200b according to the modification. When the movable portion 300a of the charging station 300 is moved to the second position on the second parking space 402 side, as illustrated in FIG. 7, the connector 302 housed in the movable portion 300*a* can be taken out of the movable portion 300*a* to be connected to an inlet (not illustrated) of the electric vehicle 200*b* parked in the second parking space 402. Further, the movable portion 300*a* is configured to be held at a third position at which the movable portion 300*a* is housed in the partition portion 404.

The fixed portion 300*b* is fixed to the inner wall portion of the opening portion 406. The fixed portion 300*b* includes a moving device (not illustrated) that moves the movable portion 300*a* in the horizontal direction (the up-down direction on the sheet surface of FIG. 5) and a control device (not illustrated) that controls operation of the moving device.

The moving device according to the modification is different from the elevating device 306 according to the embodiment discussed above in the direction of movement of the movable portion 300*a*, and is otherwise configured in the same manner as the elevating device 306 according to the embodiment discussed above. Therefore, detailed description thereof will not be repeated. The control device according to the modification is different form the control device 308 according to the embodiment discussed above in controlling the moving device discussed above in place of the elevating device 306, and is otherwise configured in the same manner Therefore, detailed description thereof will not be repeated.

The control device controls the moving device such that the movable portion 300*a* is moved from the third position to the first position when a condition for executing first movement control is met, for example. The condition for executing the first movement control includes a condition that the movable portion 300*a* is located at the third position and a condition that there is a request (hereinafter referred to as a "first movement request") to execute the first movement control. The first movement request may be received from the electric vehicle 200*a* parked in the first parking space 400, or may be received from the management server, the portable terminal, or another charging station 300, for example. The condition for executing the first movement control may include a condition that the movable portion 300*a* is located at the second position or the third position, in place of the condition that the movable portion 300*a* is located at the third position. The control device detects the amount of movement of the movable portion 300*a* using a sensor, and moves the movable portion 300*a* until the amount of movement of the movable portion 300*a* reaches a value that is equivalent to the first position, for example.

Alternatively, the control device controls the moving device such that the movable portion 300*a* is moved from the third position to the second position when a condition for executing second movement control is met, for example. The condition for executing the second movement control includes a condition that the movable portion 300*a* is located at the third position and a condition that there is a request (hereinafter referred to as a "second movement request") to execute the second movement control. The second movement request may be received from the electric vehicle 200*b* parked in the second parking space 402, or may be received from the management server, the portable terminal, or another charging station 300, for example. The condition for executing the second movement control may include a condition that the movable portion 300*a* is located at the first position or the third position, in place of the condition that the movable portion 300*a* is located at the third position. In addition, the control device moves the movable portion 300*a* until the amount of movement of the movable portion 300*a* reaches a value that is equivalent to the second position, for example.

Further, the control device controls the moving device such that the movable portion 300*a* is moved from the first position or the second position to the third position when the condition for executing the storage control is met. Specifically, the control device executes movement control such that the movable portion 300*a* is moved from the first position to the third position to be housed in the partition portion 404 when the movable portion 300*a* is located at the first position and the condition for executing the storage control is met, for example. Further, the control device executes movement control such that the movable portion 300*a* is moved from the second position to the third position to be housed in the partition portion 404 when the movable portion 300*a* is located at the second position and the condition for executing the storage control is met, for example. In the movement control, the control device moves the movable portion 300*a* until the amount of movement of the movable portion 300*a* reaches a value that is equivalent to the third position.

The condition for executing the storage control includes a condition that the movable portion 300*a* is located at the first position or the second position and a condition that there is a storage request to house the charging station 300. The storage request may be received from the electric vehicle 200*a* or the electric vehicle 200*b* when the movable portion 300*a* is located at the first position, for example. Alternatively, the storage request may be received from the electric vehicle 200*a* or the electric vehicle 200*b* when the movable portion 300*a* is located at the second position, for example. Alternatively, the storage request may be received from the management server, the portable terminal, or another charging station 300, for example.

Figure 8:
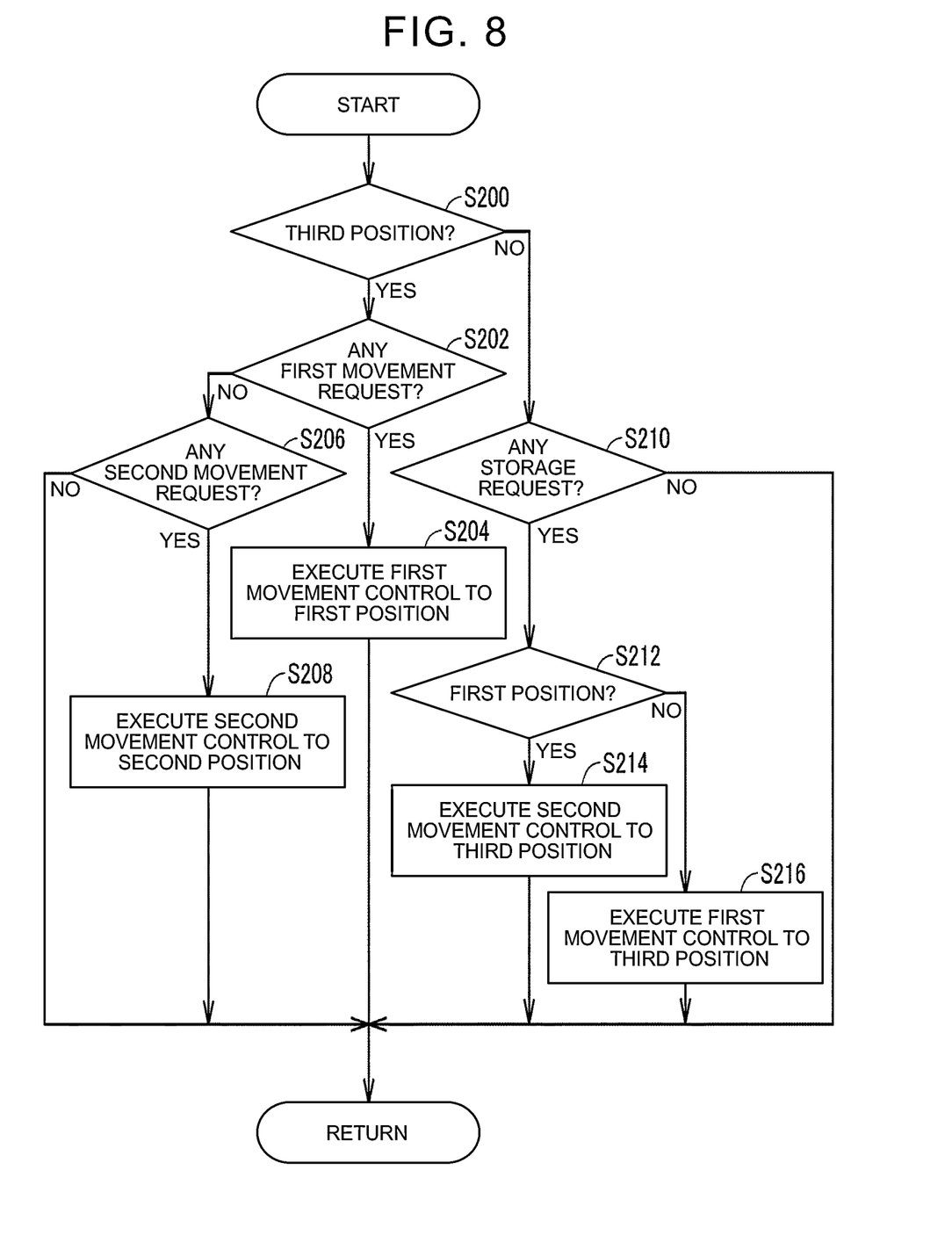
FIG. 8 is a flowchart illustrating an example of processes executed by a control device according to the modification.

With such a configuration, the control device executes the processes indicated in FIG. 8. FIG. 8 is a flowchart illustrating an example of processes executed by the control device according to the modification. The "first movement request", the "second movement request", the "first movement control", and the "second movement control" in the flowchart in FIG. 8 correspond to the "elevation request", the "lowering request", the "elevation control", and the "lowering control", respectively, in the flowchart in FIG. 4. Therefore, the processes in S200, S202, S204, S206, S208, S210, S212, S214, and S216 in FIG. 8 are substantially the same as the processes in S100, S102, S104, S106, S108, S110, S112, S114, and S116, respectively, in FIG. 4 except that the movable portion 300*a* is moved in the horizontal direction, rather than in the vertical direction. Therefore, detailed description of the content of the processes indicated in the flowchart in FIG. 8 and the operation of the control device will not be repeated.

Also with such a configuration, the battery mounted on the vehicle parked in either the first parking space or the second parking space, which are adjacent in the horizontal direction, can be charged using a single charging station 300. Consequently, it is not necessary to install the charging apparatus in each of the first parking space and the second parking space. Therefore, it is possible to suppress an increase in the installation cost for installing the charging apparatus so as to be usable in a plurality of parking spaces.

The modifications described above may be wholly or partially combined with each other as appropriate. The embodiment disclosed herein should be construed as illustrative in all respects and not restrictive. The scope of the present disclosure is defined by the claims, rather than the above description, and is intended to include all modifications that fall within the meaning and scope of equivalence to the claims.

What is claimed is:

1. A charging apparatus for charging an energy storage device mounted on a vehicle comprising:
   a movable portion that includes a connection device that is connectable to the energy storage device of the vehicle parked in one of a first parking space or a second parking space; and
   a moving device configured to move the movable portion to one of a first position at which the movable portion projects into a space that is close to the first parking space with respect to a partition portion that separates the first parking space and the second parking space, a second position at which the movable portion projects into a space that is close to the second parking space with respect to the partition portion, and a third position at which the movable portion is housed in an opening portion in the partition portion, wherein:
   the charging apparatus is installed in the opening portion so that outer peripheral surface of the charging apparatus is away from an inner peripheral surface of the opening portion by a predetermined gap,
   wherein the first parking space is located in a level directly above a level of the second parking space, and the partition portion is provided between a floor of the first parking space and a ceiling of the second parking space, and
   the first parking space is located in a level directly above a level of the second parking space, and the partition portion is between a floor of the first parking space and a ceiling of the second parking space.

2. The charging apparatus according to claim 1, wherein the first parking space is adjacent to the second parking space in a horizontal direction, and the partition portion is provided between a partition wall of the first parking space and a partition wall of the second parking space.

3. The charging apparatus according to claim 1, further comprising a control device configured to control the moving device using information acquired from an external device that is external to the charging apparatus, wherein the control device is configured to control the moving device so as to move the movable portion to one of the first position, the second position, and the third position corresponding to a movement request to move the movable portion when the movement request is acquired from the external device.

4. The charging apparatus according to claim 1, wherein the moving device includes a sensor.

5. The charging apparatus according to claim 4, wherein the moving device is configured to:
   detect an amount of elevation of the movable portion by the sensor, and
   elevate the movable portion until the amount of elevation of the movable portion reaches a predetermined value for the movable portion to reach the first position.

6. A charging apparatus for charging an energy storage device mounted on a vehicle comprising:
   a movable portion that includes a connection device that is connectable to the energy storage device of the vehicle parked in one of a first parking space or a second parking space; and
   a moving device configured to move the movable portion to one of a first position at which the movable portion projects into a space that is close to the first parking space with respect to a partition portion that separates the first parking space and the second parking space, a second position at which the movable portion projects into a space that is close to the second parking space with respect to the partition portion, and a third position at which the movable portion is housed in an opening portion in the partition portion, wherein:
   the charging apparatus is installed in the opening portion so that outer peripheral surface of the charging apparatus is away from an inner peripheral surface of the opening portion by a predetermined gap,
   wherein the first parking space is located in a level directly above a level of the second parking space, and the partition portion is provided between a floor of the first parking space and a ceiling of the second parking space,
   wherein the first parking space is located in a level directly above a level of the second parking space, and the partition portion is between a floor of the first parking space and a ceiling of the second parking space.

7. The charging apparatus of claim 6, wherein the first position is above the floor of the first parking space.

* * * * *